United States Patent Office 3,407,087
Patented Oct. 22, 1968

3,407,087
PROCESS FOR DULLING GLASS FIBERS WITH OXALIC ACID INCLUDING PRETREATMENT WITH CALCIUM SALTS
Allen J. Jinnette, Greensboro, N.C., assignor to Burlington Industries, Inc., Greensboro, N.C., a corporation of Delaware
No Drawing. Filed Aug. 26, 1964, Ser. No. 392,293
9 Claims. (Cl. 117—72)

ABSTRACT OF THE DISCLOSURE

A process for dulling glass fibers which includes treating the glass fibers with an aqueous solution of oxalic acid in the presence of added calcium ions. The calcium ions can be provided from an aqueous solution of a water-soluble calcium salt, such as calcium chloride.

The present invention relates to the treatment of glass fibers for the purpose of producing a dulling effect and otherwise improving the characteristics of the treated fibers. More particularly, the invention is concerned with certain unique improvements in the process described and claimed in copending application Ser. No. 266,013, now U.S. Patent 3,259,517, the subject matter of which is incorporated herein by reference.

According to Ser. No. 266,013, glass fibers, typically in the form of woven fabric, are treated with oxalic acid to produce a desired degree of dullness or opacity in the fabric. The process of Ser. No. 266,013 eliminates a number of serious disadvantages encountered in glass dulling techniques, e.g. loss of tensile strength or crack resistance, lack of resistance to laundering, etc., and therefore, represents a very unique and significant advance in the art. However, according to the present invention, it has now been unexpectedly found that even better results are obtained in dulling effect and other characteristics if the oxalic acid treatment is carried out in the presence of added calcium ions over and above any calcium present in the glass undergoing treatment. Other unique features of the invention will also be hereinafter apparent.

According to the invention, the calcium ions may be added to the glass either before the oxalic acid treatment or simultaneously therewith. The amount of calcium added can be varied but usually will fall in the range of about .25 to 1.00% on the weight of the fibers (in the dry state) or stated another way, from 25 to 90% on the weight of the oxalic acid utilized.

In a preferred embodiment of the process described in Ser. No. 266,013, the desired dulling effect is obtained using the following three phase operations on, for example, heat-cleaned woven glass fabric or the like:

*Phase I*:
   Resin pad
   Dry
*Phase II*:
   Oxalic acid treatment
   Dry
*Phase III*:
   Apply top binder finish
   Dry and cure The "three phase" operations noted above are also advantageously utilized in the present invention, the calcium ions preferably being included in the resin pad of Phase I. Certain modifications in the resin pad and top binder finish of Phases I and III, respectively, are also visualized for use with the added calcium feature to give a finished product possessing optimum characteristics.

The desired amount of calcium ions may be included in the resin pad, which is usually aqueous, by dissolving calcium chloride therein. Usually, the composition will include from about 0.5 to 1% by weight of added calcium although other proportions, e.g. 0.25 to 3%, may be used. Other water-soluble calcium salts may be used in lieu of, or in addition to, calcium chloride but the latter is preferred.

It will be appreciated that the addition of calcium ions need not be combined with the resin pad as described. Thus, as an alternative, the textile may be immersed in an aqueous resin-free solution of calcium chloride or the equivalent prior to acid treatment and with or without the use of a separate resin pad.

The resin pad as used herein may be formulated in the manner of Ser. No. 266,013 so as to include, in addition to the desired calcium ions, components which facilitate the subsequent application of the oxalic acid and its reaction with glass fibers. Thus, as shown in Ser. No. 266,013, the pad formulation should contain at least one resinous material which will entrap and hold any particles of calcium oxalate which may be formed by reaction of oxalic acid with calcium contained in the glass and/or added thereto according to the present invention. Typical resinous materials suitable for this purpose include thermoplastic resins, with or without plasticizer, such as polystyrene, polyacrylic acid derivatives, including polymethyl methacrylate, ethyl methacrylate, and the like, polyvinyl esters such as polyvinyl acetate, polyvinyl chloride and copolymers of vinyl acetate and vinyl chloride cellulose ethers and esters such as cellulose acetate, ethyl cellulose, and natural and synthetic rubbers. Thermosetting resins may also be used such as the urea-aldehyde, melamine-formaldehyde and polyester resins. Entrapment of calcium oxalate particles by means of the resin or resins used in Phase I is necessary to provide the permanent dulling effect and to achieve internal lubricity in the glass yarn or fabric. It appears that the calcium oxalate particles are of such a degree of softness and of such a crystalline form that they separate the glass fibers from each other in much the same way as ball bearings separate moving metal parts in machinery. This separation keeps the glass fibers from abrading each other when the yarn or cloth is flexed or folded thus also bringing about an increase in tensile strength and crack resistance.

As a further feature of the present invention, it has been found highly advantageous to include in the Phase I pad composition a silane crosslinking agent containing a reactive grouping. The function of this cross-linking agent is to anchor the resin of the resinous pad (Phase I) to the glass surface. Additionally, however, the silane serves as an anchoring agent and catalyst for the top finishing binder system (Phase III). The silane crosslinking agent used herein may be an aminoalkyl trialkoxy silane containing at least one amino group and up to about 10 carbon atoms, exclusive of those in the alkoxy groups attached to the silicon atom, each alkoxy group containing from 1–3 carbon atoms. Best results are obtainable with aliphatic silanes containing one or more secondary groups or both primary and secondary groups. Typical examples of such compounds are those represented by the formula:

wherein $m$ and $n$ are integers from 1 to 4 preferably 2 to 3, R is alkyl containing from 1 to 3 carbon atoms and $R_1$ is hydrogen, methyl or ethyl. An especially preferred silane is N-(2-aminoethyl)-3-propylamino trimethoxy silane represented structurally as

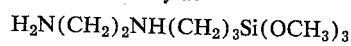

and commercially available as Z-6020 or A-1100. An acrylic modification of Z-6020, available as XZ-8-4032, may also be mentioned as a specific illustration of a silane useful herein.

The pad composition of Phase I may also contain a colloidal silica ($SiO_2$) or like inert particulate binder as in the case of Ser. No. 266,013. This material (which has previously been used for treating glass fibers, see, for example, U.S. Patents 2,754,224 and 2,992,124) improves the cohesion of the glass fibers and tends to even them out thereby removing or distributing stresses which may exist therein. The pad composition can contain from 0.3 to 1.2% by weight of colloidal silica or like material. This addition is for slippage control and is not necessary in all cases.

If the cloth or other fibers undergoing treatment are to be colored, dyes or pigments should be included in the Phase I pad. In this case, the resinous binder should be selected so as to bind or fix the coloring agent as well as the calcium oxalate particles. Any of the resinous binders mentioned above can be used for this purpose.

The Phase I pad composition is usually applied to the glass fabric at room temperature (65–70° F.) although temperatures ranging up to the boil may be used if desired. Solids pickup will generally amount to from 1.0 to 4.0% by weight, based on the dry weight of the fabric.

After the pad, the fabric must be dried and cured before the oxalic acid treatment can take place. The temperature used for drying and curing can be widely varied and will depend on the pad composition and other operating conditions. Usually, however, the drying and curing are carried out at temperatures in the range of 250–400° F., typically 350°–375° C., with care being taken to avoid tendering or otherwise damaging the fabric. Air or radiant drying means are normally used and, as indicated, the time of drying and curing is regulated to accomplish the desired purpose without overexposing the fabric to heat. In a continuous setup, for example, the dry and cure may be accomplished in 20 seconds at 350–375° F.

Where a dye or pigment is included in the Phase I pad, it is usually preferred to omit the calcium from this pad and add the same to the fabric after curing the Phase I pad but prior to the acid treatment. This produces a greater degree of dulling and may be accomplished by subjecting the dyed or pigmented textile to a second aqueous pad containing a small amount of the binder used in Pad I plus the requisite amount of soluble calcium salt, and then resubjecting the thus treated goods to the drying and curing temperature used above in Phase I.

The Phase II acid treatment may be carried out with an aqueous solution containing from about 0.1% up to about 10% by weight oxalic acid, with 1–6% a preferred range of acid concentration. The important factor is to select an appropriate concentration which will give the desired degree of dulling without tendering the fibers at the times and temperatures used. Usually, the temperature will fall in the range of 80° F. up to the boil (212° F.). The time of treatment may be as low as one second or even a fraction thereof, at higher temperatures (e.g. 190–212° F.) with an appropriate time increase to, for example, 15–45 seconds or even higher, when operating at the lower temperatures in the range mentioned above. One preferred set of conditions comprises 1% oxalic acid solution at 150° F. for 30 seconds. Essentially equivalent results can be obtained using the 1% acid solution at 190° F. for 1–7 seconds. In some instances, optimum effects are obtained in dulling and other physical properties, e.g. tensile strength, using longer times and lower temperatures while in other cases, the effects are optimized at higher temperatures and lower times. In any event, it has been found that the use of added calcium ions and the various other features of this invention give a highly desirable dulling effect in shorter treatment times and better overall properties than can be obtained when these features are omitted.

Advantageously, the acid treatment is carried out by drawing the fabric continuously through the aqueous acid solution in a vessel open to the atmosphere followed by passage of the fabric through appropriate squeeze rolls where excess acid is removed. Usually, there is a weight pickup of 45–240% on the weight of dry fabric when the fabric is withdrawn from the acid treatment, the actual pickup depending on the construction and type of yarn in the fabric. The squeeze rolls cut the pickup down to 15 to 80%, based on the dry weight of fabric and the fabric is then subjected to dry heat (heat-quenched) to decompose or otherwise remove any remaining unreacted acid. The drying temperature may run from 320° F. up to, for example, 525° F. with 350°–510° F., representing a preferred and practical range. The duration of this heat treatment should not substantially exceed the point where the fabric is dry with times of the order of 15 seconds to 2 minutes normally sufficient.

After drying the fabric, the Phase III top finish is applied to insure the permanence of the dulling effect obtained with the acid treatment. Preferably, the top finish is applied by passing the fabric through an open aqueous bath containing one or more suitable resinous binders or fixing agents as described in Ser. No. 266,013.

Any conventional resinous binder may be used for this purpose including the resins mentioned heretofore in connection with the Phase I treatment. Resin solids pickup in the top finish treatment will normally be in the range of 0.3 to 2% by weight, based on the weight of dry fabric from Phase II.

According to another feature of the invention, it has been found extremely advantageous to include an epoxy resin in the top binder composition. This component, in combination with the other features described herein, gives a product which retains the desired dulling effect and other characteristics under the most severe machine washing conditions. Epoxy resins broadly are suitable for use herein but optimum results are obtained if the epoxy is one which can react with the silane cross-linking agent used in the Phase I resin pad. Typically suitable epoxies include the bisphenol-epi-chlorhydrin type and epoxidized oils, e.g. epoxy soybean oil, or the like.

It may also be advantageous to include a chrome complex, i.e. a Werner complex compound having an acido group coordinated with the trivalent nuclear chromium atom which is capable of strong coordination with the groupings that exist on the glass fiber surfaces, as described in U.S. Patents 2,356,161 and 2,273,040. A typical example of one such chrome complex is "Quilon" which is stearato chromic chloride.

After application of the top finish, the fabric is again dried and cured at, for example, 212° to 520° F. The resulting products are superior to the products obtained in Ser. No. 266,013 in such properties as dullness, strength and resistance to mechanical washing. Additionally, as noted heretofore, the present process makes it possible to realize the desired degree of dulling and other improved characteristics in a shorter overall period of treatment.

The glass fibers treated herein may be of any conventional composition. Typically suitable fibers are those made from glass of the following approximate composition in parts by weight:

| | |
|---|---|
| Silicone dioxide | 52–56 |
| Calcium oxide | 16–25 |
| Aluminum oxide | 12–16 |
| Boron oxide | 8–13 |
| $Na_2O$ | 0–1 |
| Magnesium oxide | 0–6 |

Other suitable glass compositions are shown, for example in U.S. Patents 2,582,919 and 3,011,929.

The invention is illustrated but not limited by the following examples wherein parts and percentages, unless otherwise stated, are by weight:

Example I

A fabric woven with glass "E" yarn in both warp and filling was first heat cleaned using the process shown in U.S. Patent 2,970,934. The heat cleaning process of U.S. Patent 3,012,848 could also be used with equal effect.

The heat cleaned fabric was immersed in a first pad having the following composition:

| | Percent |
|---|---|
| Acrylic/melamine-formaldehyde resin copolymer | 1 |
| Silicone Z-6020 | ½ |
| Calcium chloride | 2 |
| Water, to 100%. | |

The copolymer component in the above formulation is advantageous for use herein because it does not soften during the acid treatment.

The fabric was dipped in the pad composition, run through a pad, resulting in a wet pickup of 35% based on the fabric weight prior to immersion. The fabric was dried by heating at 375° F. for about 1–1.5 minutes and then immersed in a 3% solution of oxalic acid at 190° F. for 3.5 seconds. The fabric was then again dried by heating at 375° F. for 40 seconds.

Thereafter, the fabric was immersed in an aqueous pad containing:

| | Percent |
|---|---|
| Acrylic resin | 10 |
| Epoxy soybean oil (30% emulsion) | 11 |
| Epoxy resin mixture | 3 |
| Quilon | 1.5 |
| Water, to make 100%. | |

In the above formula, the acrylic resin was a copolymer of methyl and ethyl acrylate containing as reactive groupings COOH, NH and OH and the epoxy resin mixture was a 50% emulsion of epoxy resin of the bisphenolepichlorhydrin type and epoxy soybean oil. Quilon is a chrome complex such as described in U.S. Patents 2,356,161 and 2,273,040. A wet pickup of 30% by weight was obtained. The fabric was then dried and cured by heating at 375° F. for 40 seconds. This fabric was then given a vigorous water wash at 180° F. and then dried.

The resulting product had an opacity or dullness superior to that of the product obtained by the process of Ser. No. 266,013 omitting the use of calcium chloride. To obtain the same degree of dullness by the process of Ser. No. 266,013, the overall length of treatment had to be extended by 200%. Even then, other advantages of the present process, e.g. superior hand, tensile strength, crack resistance and especially the substantially improved resistance to mechanical laundering, were not realized.

Example II

The process of Example I was repeated except that a 1% oxalic acid solution was used at 150° F. for 30 seconds with essentially equivalent results.

Example III

The process of Example I was repeated using the following conditions:

Resin pad:

| | Percent |
|---|---|
| Acrylic resin | 3 |
| Hexa methoxy methyl melamine | 1 |
| XZ-8-4032 | ½ |
| Calcium chloride | 1 |
| Water, to make 100%. | |

The acrylic resin in the above formula is a 50% dispersion of the copolymer of methyl and ethyl methacrylate in water. XZ-8-4032 is an acrylate modification of product Z-6020 mentioned above in Example I.

Acid treatment:
4.5% oxalic acid solution.
180° F. for 2 seconds.

Top finish:

| | Percent |
|---|---|
| Acrylic resin as in pad | 12 |
| Epoxy soybean oil (50% emulsion in water) | 10 |
| Epoxy resin | 3 |
| Quilon | 1 |
| Water, to make 100%. | |

The epoxy resin used above is a 50% emulsion of bis-phenol-epichlorhydrin epoxy in water. The results obtained were the same as in the case of Example I.

As will be apparent from the foregoing, the invention herein is preferably applied to woven fabric comprising glass fibers which have previously been Coronized or otherwise heat cleaned. Coronizing or heat cleaning of glass fibers and fabrics is well known in the art (see, for example, U.S. Patents 2,970,934 and 3,012,845). Basically, the heat cleaning operation serves to remove fabricating sizes and may be accomplished with or without a flame treatment. Glass fabrics treated by any of the conventional heat cleaning methods may be used for present purposes. Furthermore, while the invention is especially advantageous for the treatment of woven glass fabrics, it will also be appreciated that the process may be applied to nonwoven fabric or to glass fibers before a fabric is formed.

It will be appreciated that the invention may be used to prepare decorative and industrial fabrics, e.g. drapery or filter materials, which have widely different constructions but are characterized by permanent dulling and improved crack resistance and tensile strength. Novelty fabrics may be prepared, for example, by using a warp or filling glass yarn which has been treated according to the invention and untreated glass yarn or a yarn of a completely different material in the other direction. Other modifications may also be made in the invention described herein without deviating from the scope thereof as set forth in the following claims:

I claim:
1. In a process for producing a dulling effect in a glass textile by treating the same with a resinous pad composition comprising a thermoplastic or thermosetting resin, drying said resin treated glass textile and thereafter treating the same with an aqueous solution of oxalic acid, the improvement which comprises impregnating said textile, prior to said treatment with oxalic acid, with an aqueous solution of water-soluble calcium salt so that there is added to said textile calcium ions in an amount of about 0.25 to 1.00% based on the weight of said glass textile in the dry state and thereafter treating said textile with said acid whereby dulling of said textile is improved by reaction between said acid and added calcium ions to form calcium oxalate in situ.

2. The process of claim 1 wherein the water-soluble salt is added to the textile as a part of the resinous pad composition, said composition containing said salt in the amount of 0.25 to 3% by weight of the pad composition.

3. The process of claim 1 wherein said water soluble calcium salt is calcium chloride.

4. The process of claim 3 which includes drying said acid treated glass textile, treating said dried acid treated glass textile with a resinous binder composition comprising a thermoplastic or thermosetting resin and curing said resinous binder composition.

5. The process of claim 4 wherein said resinous pad composition includes a silane of the formula

wherein $m$ and $n$ are integers from 1 to 4, R is alkyl containing from 1 to 3 carbon atoms and $R_1$ is hydrogen, methyl or ethyl.

6. The process of claim 5 wherein said silane is N-(2-aminoethyl)-3-propylamino-trimethoxy silane and the epoxy is an epoxidized oil.

7. The process of claim 5 wherein the resinous binder composition includes an epoxy compound selected from the group consisting of bisphenolepichlorohydrin, an epoxidized oil and their mixtures.

8. A process for producing a dulling effect in glass textile comprising contacting said textile, prior to treatment with oxalic acid, with a resinous pad composition comprising an aqueous dispersion of thermoplastic or thermosetting resin and with a water soluble calcium salt present in amounts of 0.25 to 1% by weight of said glass textile on a dry basis at a temperature ranging from about 65° F. to the boil, heating said glass textile to a temperature ranging from 250–400° F. to dry and cure the same, treating the glass textile with an aqueous solution of oxalic acid containing about 0.1% to about 10% by weight of the acid at a temperature ranging from about 80° F. up to the boil, heating the acid treated glass textile to a temperature ranging from about 320–525° F. to dry said textile, coating the acid treated glass with a resinous binder top finish composition comprising an aqueous dispersion of a thermoplastic or thermosetting resin in amounts sufficient to provide a resin solids pick up in the range of 0.3 to 2% by weight based on the weight of the dried acid treated glass textile and heating said top finish composition at a temperature of about 212–520° F. to again dry and cure the same.

9. The process of claim 8 wherein said glass textile is contacted with said resinous pad composition and said water soluble calcium salt substantially simultaneously.

References Cited

UNITED STATES PATENTS

| | | | |
|---|---|---|---|
| 3,169,884 | 2/1965 | Marzocchi et al. | 117—124 X |
| 3,232,788 | 2/1966 | Marzocchi et al. | 117—126 |
| 3,259,517 | 7/1966 | Atwell | 117—72 X |

ALFRED L. LEAVITT, *Primary Examiner.*

H. COHEN, *Assistant Examiner.*